(12) United States Patent
Kalinowski et al.

(10) Patent No.: US 11,714,285 B1
(45) Date of Patent: Aug. 1, 2023

(54) HEAD-MOUNTABLE DEVICE WITH HEAD SECUREMENT MECHANISM

(71) Applicant: Apple Inc., Cupertino, CA (US)

(72) Inventors: David A. Kalinowski, Redwood City, CA (US); Cameron A. Harder, San Francisco, CA (US); Brian S. Lau, Sacramento, CA (US); Eric N. Vergo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 61 days.

(21) Appl. No.: 16/905,573

(22) Filed: Jun. 18, 2020

Related U.S. Application Data (60) Provisional application No. 62/877,242, filed on Jul. 22, 2019.

(51) Int. Cl.
*G02B 27/01* (2006.01)
*G02B 27/09* (2006.01)

(52) U.S. Cl.
CPC ...... *G02B 27/0176* (2013.01); *G02B 27/0994* (2013.01); *G02B 2027/014* (2013.01); *G02B 2027/0178* (2013.01); *G02B 2027/0187* (2013.01)

(58) Field of Classification Search
CPC ............ G02B 27/0176; G02B 27/0994; G02B 2027/014; G02B 2027/0178; G02B 2027/0187
See application file for complete search history.

(56) References Cited

U.S. PATENT DOCUMENTS

| | | | |
|---|---|---|---|
| 4,618,226 A | 10/1986 | Sartor et al. | |
| 5,794,753 A * | 8/1998 | Kemper | F16D 13/583 |
| | | | 192/70.27 |
| 6,163,926 A | 12/2000 | Watanabe | |
| 11,402,644 B1 * | 8/2022 | Wang | G02B 27/0176 |
| 2004/0218776 A1 * | 11/2004 | Rolla | A42B 3/166 |
| | | | 381/376 |
| 2006/0153415 A1 * | 7/2006 | Weyer | G02C 11/10 |
| | | | 381/381 |
| 2008/0040887 A1 * | 2/2008 | Dickerson | E05D 11/087 |
| | | | 16/342 |
| 2010/0291978 A1 * | 11/2010 | Kim | H04M 1/0216 |
| | | | 455/575.1 |
| 2011/0090135 A1 * | 4/2011 | Tricoukes | G02B 27/0176 |
| | | | 345/8 |
| 2012/0105740 A1 * | 5/2012 | Jannard | G06F 3/16 |
| | | | 351/158 |
| 2012/0287284 A1 * | 11/2012 | Jacobsen | G06F 3/012 |
| | | | 345/419 |
| 2013/0070198 A1 * | 3/2013 | Willey | G02C 11/10 |
| | | | 351/158 |

(Continued)

*Primary Examiner* — Ariel A Balaoing
(74) *Attorney, Agent, or Firm* — BakerHostetler (57) ABSTRACT

Head-mountable devices can provide comfortable securement to a head of a user while also providing operative connections for communication across a hinge of the head-mountable device. The securement can be based on an arrangement of spring elements that have biased configurations and allow gentle retraction against a head of the user. Head-mountable devices of the present disclosure can provide adjustable securement against a head of a user by allowing custom fitting, for example with a tensioner.

19 Claims, 7 Drawing Sheets

(56) References Cited

U.S. PATENT DOCUMENTS

| | | | | |
|---|---|---|---|---|
| 2013/0089214 A1* | 4/2013 | Tricoukes | ............... | G06F 1/163 |
| | | | | 381/74 |
| 2013/0285886 A1* | 10/2013 | Pombo | ............... | G02B 27/0149 |
| | | | | 345/8 |
| 2014/0043212 A1* | 2/2014 | Park | .................... | G02B 27/017 |
| | | | | 345/8 |
| 2016/0131913 A1* | 5/2016 | Kim | .................. | G02B 27/0176 |
| | | | | 359/630 |
| 2016/0363771 A1* | 12/2016 | Miller | .................... | H04R 1/028 |
| 2018/0180895 A1* | 6/2018 | Pombo | ............... | G02B 27/0176 |
| 2018/0292660 A1 | 10/2018 | Eastwood | | |
| 2019/0149748 A1* | 5/2019 | Backstrom | ........... | H04N 5/2628 |
| | | | | 348/148 |
| 2019/0155021 A1* | 5/2019 | Wall | .................... | G02B 26/085 |
| 2020/0050000 A1* | 2/2020 | Yoshida | ............... | E05D 11/0081 |
| 2020/0109756 A1* | 4/2020 | Harper | ..................... | F16F 1/32 |
| 2020/0225492 A1* | 7/2020 | Williams | ............. | G06F 9/3877 |

* cited by examiner

HEAD-MOUNTABLE DEVICE WITH HEAD SECUREMENT MECHANISM

CROSS-REFERENCE TO RELATED APPLICATION

This application claims the benefit of U.S. Provisional Application No. 62/877,242, entitled "HEAD-MOUNTABLE DEVICE WITH HEAD SECUREMENT MECHANISM," filed Jul. 22, 2019, the entirety of which is incorporated herein by reference.

TECHNICAL FIELD

The present description relates generally to head-mountable devices, and, more particularly, to head securement mechanisms for head-mountable devices, such as eyeglasses.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include audio output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as smart eyeglasses, head-mountable displays, headsets, visors, head-up display, and the like can perform a range of functions that is determined by the components (e.g., sensors, circuitry, and other hardware) included with the wearable device as manufactured. It can be desirable to provide the components of the head-mountable device with mechanisms to secure the head-mountable device against a head of the user. It can also be desirable to provide the components of the head-mountable device with operative connections for communication there between. It can also be desirable to provide the components of the head-mountable device with adjustable fit features to allow a variety of users to comfortable wear the head-mountable device.

Head-mountable devices of the present disclosure can provide comfortable securement to a head of a user while also providing operative connections for communication across a hinge of the head-mountable device. The securement can be based on an arrangement of spring elements that have biased configurations and allow gentle retraction against a head of the user. Head-mountable devices of the present disclosure can provide adjustable securement against a head of a user by allowing custom fitting, for example with a tensioner.

These and other embodiments are discussed below with reference to FIGS. 1-17. However, those skilled in the art will readily appreciate that the detailed description given herein with respect to these Figures is for explanatory purposes only and should not be construed as limiting.

Figure 1:
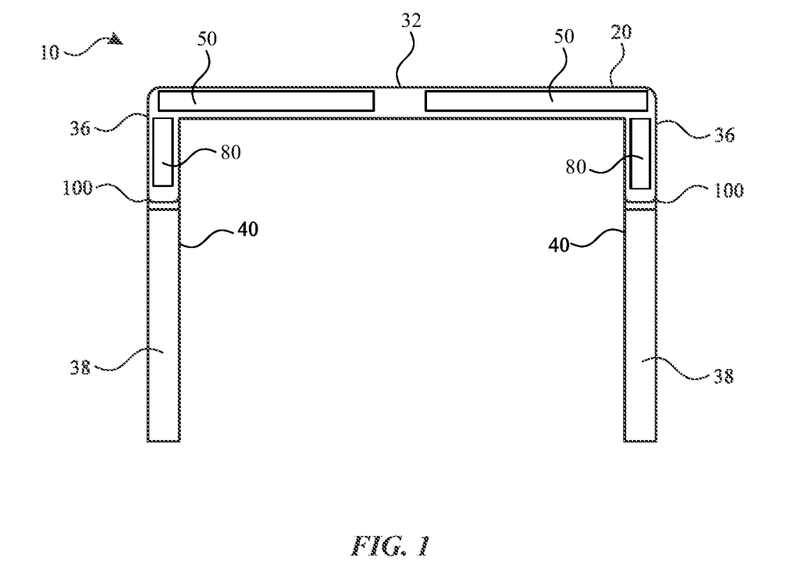
FIG. 1 illustrates a perspective view of a head-mountable device, according to some embodiments of the present disclosure.

According to some embodiments, for example as shown in FIG. 1, a head-mountable device 10 includes a frame 20 that is worn on a head with one or more arms 40. The frame 20 can be positioned in front of the eyes of a user to provide information within a field of view of the user. The frame 20 can provide nose pads 34 or another feature to rest on a user's nose. The frame 20 further includes one or more optical modules 50 and a bridge 32 above the nose pads 34 and connecting multiple optical modules 50.

The frame 20 and/or the arms 40 can serve to surround a peripheral region of the head-mountable device 10 as well as support any internal components in their assembled position. For example, the frame 20 and/or the arms 40 can enclose and support various internal components (including for example integrated circuit chips, processors, sensors, input/output devices, memory devices, and other circuitry) to provide computing and functional operations for the head-mountable device 10, as discussed further herein.

An optical module 50 can transmit light from a physical environment for viewing by the user. Such an optical module 50 can include optical properties, such lenses for vision correction based on incoming light from the physical environment. Additionally or alternatively, an optical module 50 can provide information as a display within a field of view of the user. Such information can be displayed based on operation of a display element 80 that projects light onto and/or communicates with one or more elements of the optical module 50. As shown in FIG. 1, the display element 80 can reside, at least partially, in one or more of the arms 40 and/or in the frame 20. For example, the display element 80 can reside, at least partially, within a cavity 42 extending from the frame 20 and into the arm 40. Displayed information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Referring again to FIG. 1, a frame 20 can be supported on a user's head with the arms 40. The arms 40 can wrap or extend along opposing sides of a user's head, as with temple components 36. The arms 40 can further include earpieces 38 for wrapping around or otherwise engaging a user's ears. It will be appreciated that other configurations can be applied for securing the head-mountable device 10 to a user's head. For example, one or more bands, straps, belts, caps, hats, or other components can be used in addition to or in place of the illustrated components of the head-mountable device 10. By further example, an arm can extend about a user's head to both sides of the frame 20.

The frame 20 can be coupled to or integral (e.g., monolithic) with one or more of the arms 40, including the temple components 36 and/or the earpieces 38. For example, a continuous support structure including the frame 20 can support the optical modules 50 as well as the display elements 80. While at least a portion of the arms 40 can optionally move (e.g., the earpieces 38 pivot about a hinge 100 and relative to the temple components 36) with respect to the frame 20, it will be understood that, in at least some embodiments, the frame 20 and/or the arms 40 can form a continuous structure that supports both the optical modules 50 as well as the display elements 80 to facilitate relative alignment of the optical modules 50 and their corresponding display element 80. As such, the arms 40 can refer to at least a portion of the support structure (e.g., temple components 36) that extends away from the portion of the frame 20 and that supports the optical modules 50.

In some embodiments, each of the optical modules 50 can include the display element 80 (e.g., a light projector) and a waveguide. The display element 80 can include any and all components for projecting light in the desired manner. For example, the display element 80 can include light sources, such as an RGB module, polarizers, beam splitters, collimators, lenses, and the like. The optical modules 50 can include a waveguide that allows internal reflections of received light, as well as one or more other optical components, such as corrective lenses.

The optical module 50 can include a waveguide between one or more lenses. The waveguide 54 can receive light from the display element 80. The waveguide can be provided with one or more features for transmitting light from the display element 80 to the user. For example, the waveguide can include reflective surfaces. When the light from the display element 80 enters the waveguide, it can strike a first surface with an angle of incidence greater than the critical angle above which total internal reflection occurs. The light may engage in total internal reflection and bounce between opposing surfaces until it reaches a viewing area. At the viewing area, the light can exit the waveguide (e.g., at an angle less than the critical angle).

One or more lenses of the optical module 50 can apply optical effects to light transmitted from the waveguide and to the user. For example, an inner lens can be a negative or diverging lens. An outer lens can also apply optical effects to light transmitted from an external environment and to the user. The outer lens can also apply an optical effect that negates, offsets, complements, or otherwise alters the effect of the inner lens on incoming light from the external environment. For example, the outer lens can be a positive or converging lens.

It will be understood that the components of the optical module 50 can provide vision correction to incoming light as appropriate for a given user. Such correction can be spherical, aspheric, atoric, cylindrical, single vision, multifocal, progressive, and/or adjustable. It will be understood that the components of the optical module 50 can include other optical components as required to produce a desired optical effect. For example, an optical component can include one or more diffusers, filters, polarizers, prisms, beam splitters, diffraction gratings, mirrors, and/or windows. Such components can be positioned at any location adjacent to, within, or outside of the other components of the optical module 50.

Figure 2:
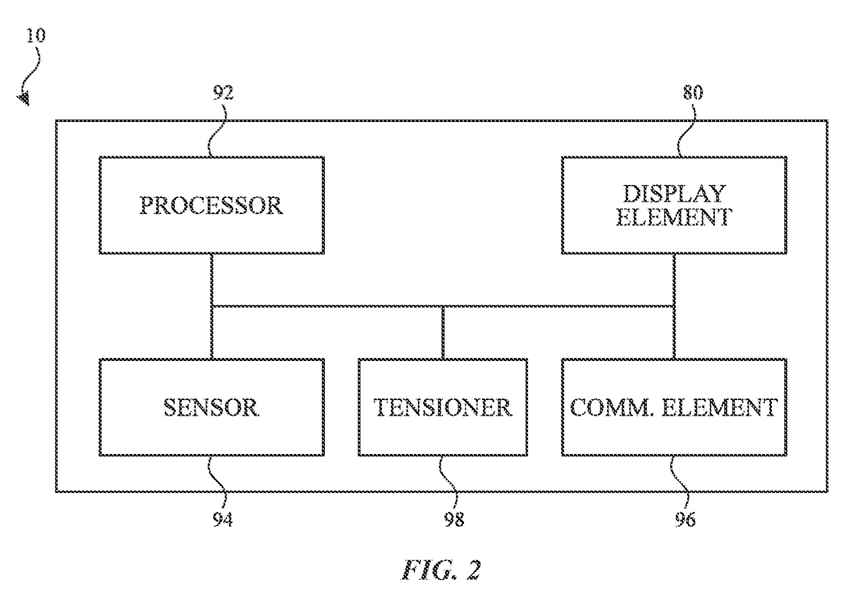
FIG. 2 illustrates a block diagram of a head-mountable device, in accordance with some embodiments of the present disclosure.

Referring now to FIG. 2, components of the head-mountable device can be provided and operatively connected to achieve the performance described herein. FIG. 2 shows a simplified block diagram of a head-mountable device 10 in accordance with one or more embodiments of the disclosure. It will be appreciated that components described herein can be provided on either or both of a frame and/or one or more arms of the head-mountable device 10.

As shown in FIG. 2, the head-mountable device 10 can include a processor 92 with one or more processing units that include or are configured to access a memory having instructions stored thereon. The instructions or computer programs may be configured to perform one or more of the operations or functions described with respect to the head-mountable device 10. The processor 92 can be implemented as any electronic device capable of processing, receiving, or transmitting data or instructions. For example, the processor 92 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The head-mountable device 10 can further include a display element 80 for displaying visual information for a user. The display element 80 can provide visual (e.g., image or video) output. The display element 80 can be or include an opaque, transparent, and/or translucent display. The display element 80 may have a transparent or translucent medium through which light representative of images is directed to a user's eyes. The display element 80 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 10 can include an optical subassembly configured to help optically adjust and correctly project the image-based content being displayed by the display element 80 for close up viewing. The optical subassembly can include one or more lenses, mirrors, or other optical devices, as discussed further herein.

The head-mountable device 10 can include one or more sensors 94. The sensor 94 can be or include a camera for capturing a view of an environment external to the head-mountable device 10. The camera can include an optical sensor, such as a photodiode or a photodiode array, a charge-coupled device (CCD) and/or a complementary metal-oxide-semiconductor (CMOS) device, a photovoltaic cell, a photo resistive component, a laser scanner, and the like. The camera may be configured to capture an image of a scene or subject located within a field of view of the camera.

Additionally or alternatively, the sensor 94 can be a sensor configured to detect and/or respond to a fit of the head-mountable device with respect to a head of a user. For example, the sensor 94 can detect the presence and/or strain against a head of a user. The sensor 94 can communicate sensed conditions to the processor 92 and/or another component, such as a tensioner.

Additionally or alternatively, the sensor 94 can be or include one or more environment sensors that are directed to an external environment. Such environment sensors can include any sensor that detects one or more conditions in an environment of the head-mountable device 10. For example, an environment sensor 160 can include an imaging device, a thermal sensor, a proximity sensor, a motion sensor, a humidity sensor, a chemical sensor, a light sensor, a magnetometer, a gyroscope, an accelerometer, a global positioning sensor, a tilt sensor, and/or a UV sensor. An environment sensor can be configured to sense substantially any type of characteristic such as, but not limited to, images, pressure, light, touch, force, temperature, position, motion, and so on.

Additionally or alternatively, the sensor 94 can be or include one or more user sensors for tracking features of the user wearing the head-mountable device 10. For example, a user sensor can perform facial feature detection, facial movement detection, facial recognition, eye tracking, user mood detection, user emotion detection, voice detection, etc. Such eye tracking may be used to determine a location of information to be displayed by the display element 80 and/or a portion (e.g., object) of a view to be analyzed by the head-mountable device 10. By further example, the user sensor can be a bio-sensor for tracking biometric characteristics, such as health and activity metrics.

The head-mountable device 10 can include one or more tensioners 98. The tensioners 98 can be connected to portions of the head-mountable device to move them relative to each other. Such movement can adjust a fit of the head-mountable device on the head of the user. The tensioners 98 can be operated based on commands from the processor 92 and/or based on detections by the sensor 94, as discussed further herein.

The head-mountable device 10 can include a communication element 96 for communicating with one or more servers or other devices using any suitable communications protocol. For example, the communication element 96 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. The communication element 96 can also include an antenna for transmitting and receiving electromagnetic signals.

The head-mountable device 10 can include one or more other components for supporting operations thereof. For example, the head-mountable device 10 can include a battery (not shown), which can charge and/or power components of the head-mountable device 10. The battery can also charge and/or power components connected to the head-mountable device 10. By further example, the head-mountable device 10 can include an input/output component (not shown), which can include any suitable component for allowing a user to provide input and/or receive output. The input/output component can include, for example, one or more buttons, crowns, keys, dials, trackpads, microphones, speakers, haptic devices, and the like.

Figure 3:
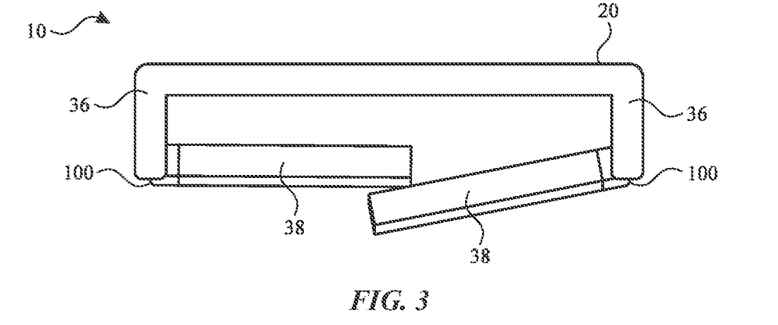
FIG. 3 illustrates a top view of a head-mountable device in a stowed position, according to some embodiments of the present disclosure.
Figure 4:
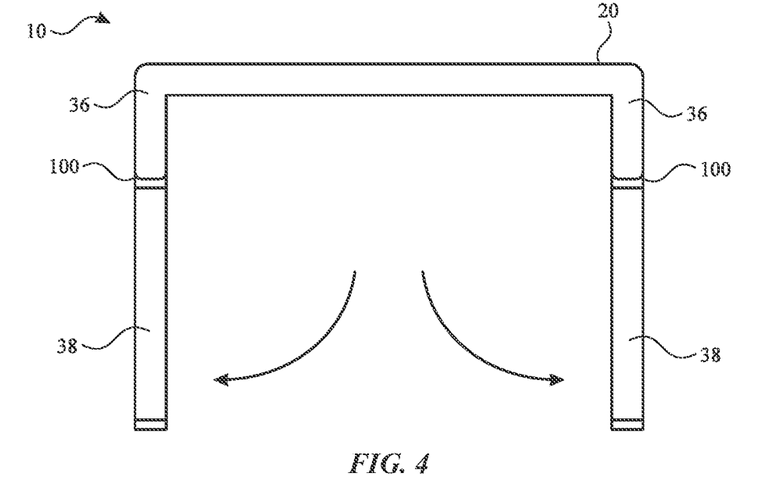
FIG. 4 illustrates a top view of a head-mountable device in an open position, according to some embodiments of the present disclosure.
Figure 5:
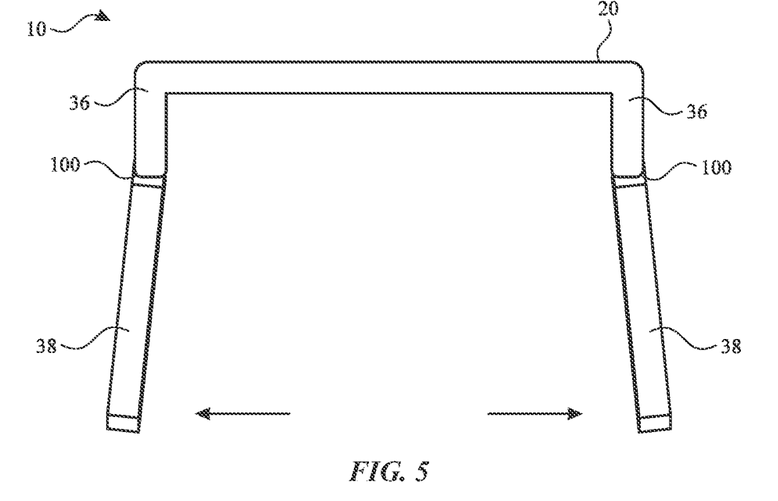
FIG. 5 illustrates a top view of a head-mountable device in a head retention position, according to some embodiments of the present disclosure.

Referring now to FIGS. 3-5, a head-mountable device can have multiple configurations based on a relative position of separate arm components, such as the temple component and the earpiece. Such positions can be provided based on rotation about a hinge.

As shown in FIG. 3, the head-mountable device 10 can be provided in a stowed position. In the stowed position, one or more of the earpieces 38 can be folded toward the frame 20 and/or the optical module 50, such that the overall space occupied by the head-mountable device 10 is minimized. In this position, the earpieces 38 can be provided at an angle relative to the corresponding temple components 36. Such angles can be smaller than in other positions, such that the earpieces 38 are arranged to be transverse (e.g., perpendicular) to the temple components 36. By further example, the earpieces 38 can extend toward each other in the stowed position. The earpieces 38 can be biased toward the stowed position from a position that is close to the stowed position, such that the earpieces 38 tend to achieve the stowed position when a user brings them near the stowed position.

As shown in FIG. 4, the head-mountable device 10 can be provided in an open position. In the open position, one or more of the earpieces 38 can extend away from the frame 20 and/or the optical module 50 to provide a space for receiving a head of a user. In this position, the earpieces 38 can extend in a direction that is generally similar to a direction in which the temple components 36 extend. By further example, the earpieces 38 can extend in a direction that is generally similar (e.g., parallel) to each other. The earpieces 38 can be biased toward the open position from a position that is close to the open position, such that the earpieces 38 tend to achieve the open position when a user brings them near the open position.

As shown in FIG. 5, the head-mountable device 10 can be provided in a head retention position. In the head retention position, one or more of the earpieces 38 can be further extended away from each other to an extent that is greater than that of the open position. In this position, the earpieces 38 can further extend away from each other upon forces from the head of the user. The earpieces 38 can be gently biased toward the open position such that the earpieces 38 apply gentle forces against the head of the user to secure the head-mountable device 10 against the head of the user.

Figure 6:
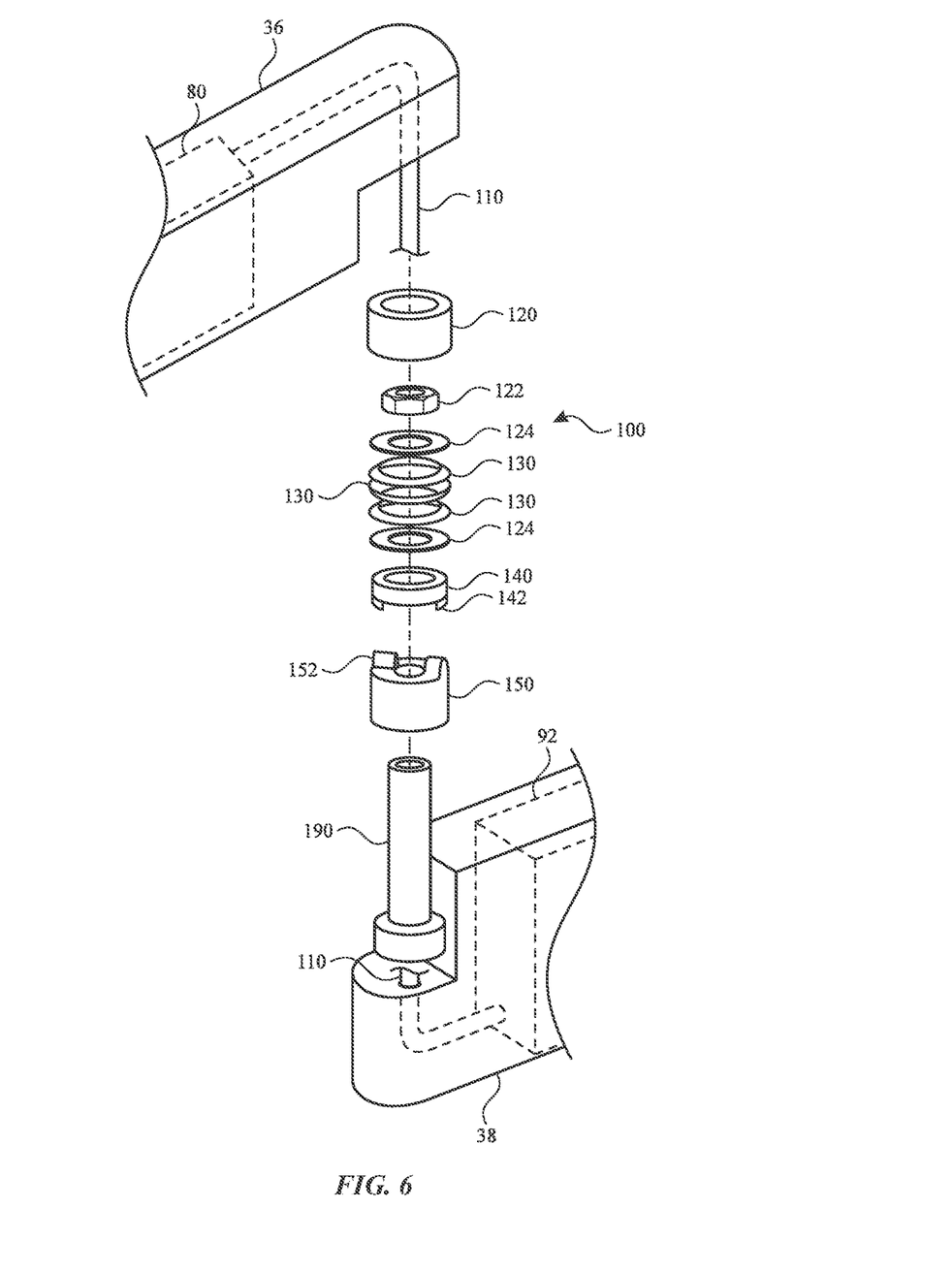
FIG. 6 illustrates an exploded perspective view of a hinge assembly of a head-mountable device, according to some embodiments of the present disclosure.

Referring now to FIG. 6, a hinge of the head-mountable device can facilitate transitions between the various positions described herein while also providing operative communication between components on different sides of a hinge.

As shown in FIG. 6, the hinge 100 can rotatably connect a temple component 36 to an earpiece 38. Each of the components on opposing sides of the hinge 100 can contain electronic components therein, and the hinge 100 can include components that operatively connect such electronic components. For example, the temple component 36 can include and/or contain the display element 80. By further example, the earpiece 38 can include and/or contain the processor 92. It will be understood that other components, including but not limited to those described herein, can be provided on opposing sides of the hinge 100.

One or more wires 110 can extend through components of the hinge 100 to operatively connect electronic components on opposing sides of the hinge. The one or more wires 110 can extend along an axis of rotation of the hinge 100, such that movement of the earpiece 38 relative to the temple component 36 is facilitated by twisting and/or torsion of the one or more wires 110. The one or more wires 110 can extend through open spaces within each of the components of the hinge 100. It will be understood that any number of wires 110 can be included. Where multiple wires 110 are provided, the wires 110 may move relative to each other to facilitate rotation of the hinge 100.

While components of the hinge 100 are shown in a particular arrangement between the temple component 36 and the earpiece 38, it will be understood that the hinge 100 can include fewer components, additional components, and/or a different arrangement of the components. For example, the components may be presented in an opposite (e.g., inverted) or otherwise different order.

The hinge 100 can include a shaft 190 that is coupled to the temple component 36 and/or the earpiece 38. The shaft 190 can provide a central channel through which the one or more wires 110 can extend. Other components of the hinge 100 can be seated on and/or about portions of the shaft 190. Such components can rotate about and/or relative to the shaft 190. The components may be shielded from the one or more wires 110 by the shaft 190.

The hinge 100 can include a collar 120 that engages and/or is positionable within a portion of the temple component 36 or the earpiece 38. The hinge 100 can further include an adjustment nut 122 that is adjustable with respect to the collar 120. As such, adjustments of the adjustment nut 122 relative to the collar 120 can be made to set initial conditions and/or biasing of spring elements of the hinge 100.

The hinge 100 can include a cam 150 and a follower 140 that engage each other at various rotational orientations. For example, the cam 150 and the follower 140 can rotate relative to each other as the temple component 36 and the earpiece 38 rotate relative to each other. The cam 150 can include at least one ramp 152 and the follower 140 can include at least one tooth 142. The ramp 152 can urge the follower 140 (e.g., via the tooth 142) against a bias. The cam 150 and/or the follower 140 can include a cylindrical body that provides an engagement surface (e.g., ramp 152 and/or tooth 142) at an axial end thereof.

The follower 140 can be biased against the cam 150 by one or more spring elements 130. The spring elements 130 can be provided in one or more arrangements, as described further herein. The bias provided by the spring elements 130 can maintain the follower 140 and the cam 150 in continuous contact and engagement, such that relative rotation of the parts cause the follower 140 in the cam 150 to move axially relative to each other (e.g., as the tooth 142 and the ramp 152 engage each other at different portions thereof). For example, by rotating the cam 150 and the follower 140 relative to each other, the tooth 142 can contact different portions of the ramp 152, thereby urging the follower 140 to a particular axial position.

While the spring elements 130 can provide an axial bias, the axial positions of the temple component 36 and the earpiece 38 can be maintained throughout relative rotation thereof. As such, the bias can be applied to the cam 150 and the follower 140, which can then apply rotational bias to the temple component 36 and the earpiece 38.

As further shown in FIG. 6, the hinge 100 can also include one or more washers 124 between axial components thereof. For example, a washer 124 can be provided on a first side of the spring elements 130 and/or another washer 124 can be provided on an opposite side of the spring elements 130. It will be understood that any number of washers can be provided at additional locations (e.g., axially between components).

It will be understood that the components of the hinge 100 can be fully housed within spaces provided by the temple component 36 and/or the earpiece 38. As such, the components can be protected from an external environment and hidden from view.

Figure 7:
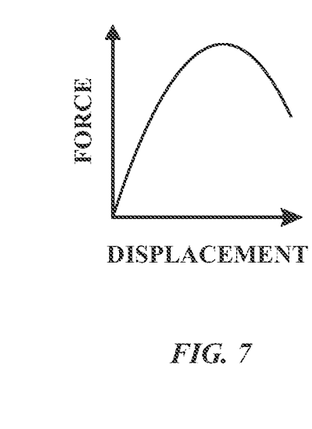
FIG. 7 illustrates a sectional view of an arrangement of spring elements for a hinge assembly, according to some embodiments of the present disclosure.

Referring now to FIG. 7, the spring elements described herein can provide particular loads across given deflections. In some embodiments, the spring elements can include Belleville washers, which are characterized by the shape of a canted washer. As shown in FIG. 7, as a Belleville washer undergoes axial compression (e.g., displacement), the response force applied in an axial direction by the Belleville washer is generally parabolic. Specifically, the response force initially increases until it reaches a maximum. From there, the response force decreases for further displacement. As such, the maximum response force is incurred along a middle portion of the range of displacement. This feature can provide the hinge with an ability to apply a maximum response force at a position (e.g., open position) that is other than the maximally extended position (e.g., head retention position).

Figure 8:
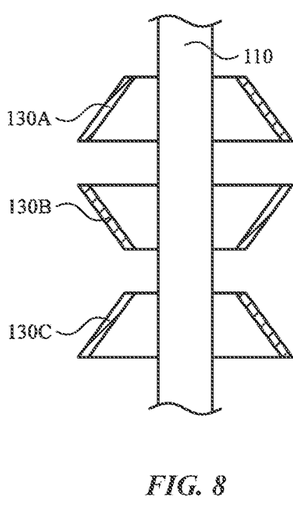
FIG. 8 illustrates a sectional view of another arrangement of spring elements for a hinge assembly, according to some embodiments of the present disclosure.
Figure 9:
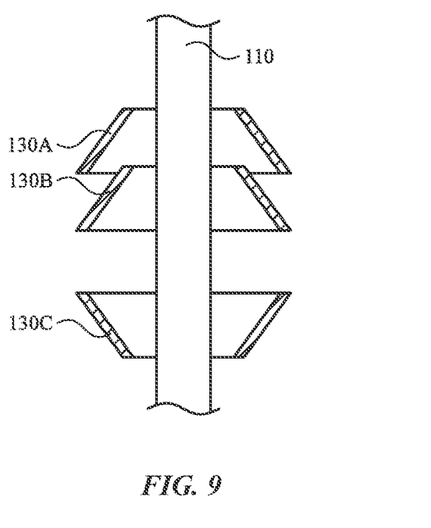
FIG. 9 illustrates a graph of a force response curve of a spring element, according to some embodiments of the present disclosure.

Referring now to FIGS. 8 and 9, spring elements (e.g., Belleville washers) can be provided in one of a variety of arrangements to provide a desired bias within the hinge. For example, Belleville washers can be provide alone, stacked in series, stacked in parallel, and/or stacked in a combination of both series and parallel.

In FIG. 8, the spring elements 130A, 130B, and 130C are provided in series, with an alternating orientations. Two washers stacked in series will yield double the displacement (e.g., compression, deflection, etc.) for a given load (e.g., equal and opposite to the response force). By extension, multiple washers stacked in series will yield a multiple (i.e., of the number of washers) of the displacement for a given load.

In FIG. 9, the spring elements 130A and 130B are provided in parallel, with a same orientation. Two washers stacked in parallel will yield double the response force for a given displacement (e.g., compression, deflection, etc.). By extension, multiple washers stacked in parallel will yield a multiple (i.e., of the number of washers) of the response force for a given displacement.

As further shown in FIG. 9, various series-parallel combinations can be provided to achieve a wide variety of combined results of response force and displacement for the stack (e.g., with some in series and some in parallel). Accordingly, the arrangement can stack in parallel to increase the load, stack in series to increase the deflection, and/or adjust the response force and displacement of a washer stack by adding or removing individual washers and/or the sequence in which they are used, whether in series or parallel. Accordingly, the spring elements can be provided in any arrangement or combination of arrangements, including alone, all in series, all in parallel, or a combination of series and parallel.

Figure 10:
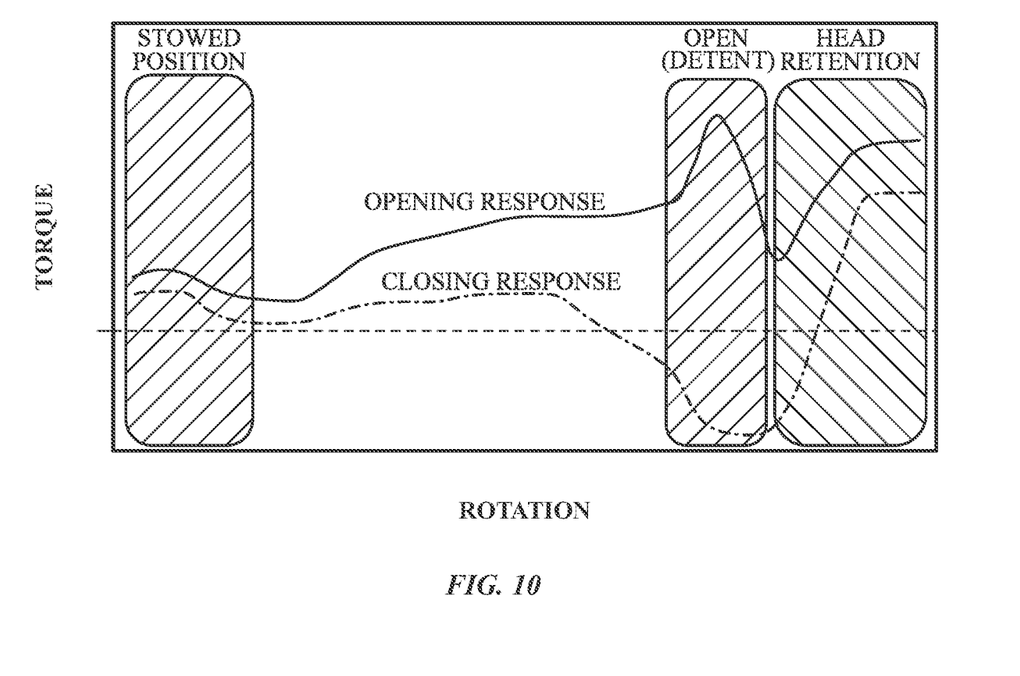
FIG. 10 illustrates a graph of a torque response curve of a hinge assembly with an arrangement of spring elements, according to some embodiments of the present disclosure.

Referring now to FIG. 10, the spring elements described herein can provide the hinge with particular responses at various positions thereof during an opening process and a closing process. As shown in FIG. 10, at particular rotational orientations (x-axis), different torques are provided. The torque values can represent the torque required to achieve a given movement and/or a response provided by the hinge as the movement occurs. For example, during a consistent opening or closing process, the applied torque can be balanced with the response provided by the hinge.

As further shown in FIG. 10, an opening process can start with an earpiece in a stowed position relative to a temple component. As the earpiece is brought to an open position, the response torque can increase until it reaches a maximum value. Beyond the position corresponding to the maximum torque, the response torque can decrease, representing a position in which the hinge is biased (i.e., the open position). Such an effect can be provided by a detent formed by the cam and follower and/or the arrangement of spring elements. From the open position, the user can apply the head-mountable device to the head, causing the earpieces to further move and engage the head of the user. As the earpieces move from the open position to the head retention position, the response torque can again increase. However, the response torque can be less than the maximum value of the response torque when moving from the stowed position to the open position. For example, less torque can be required to move from the open position to the head retention position than is required to move from the stowed position to the open position. This lower requirement can be achieved by the cam and follower and/or the arrangement of spring elements. For example, the parabolic response of the spring elements can allow greater displacement in response to a lower load once the spring element has been compressed to and/or beyond a certain point, as described herein.

As further shown in FIG. 10, a closing process can start with an earpiece in the head retention position relative to a temple component. As the head-mountable device is removed from a head of the user, the bias provided by the hinge urges the earpiece to the open position by providing a positive response torque. As the earpiece moves further from the open position toward the stowed position, the user may encounter the bias that urges the earpiece toward the open position, thereby providing a negative response torque that must be overcome to move beyond the open position toward the stowed position. As the earpiece moves from the open position toward the stowed position, the user may encounter a bias that urges the earpiece toward the stowed position, thereby providing a positive response torque.

Accordingly, the head-mountable device can be secured against a head of the user based on an arrangement of spring elements that have biased configurations and allow gentle retraction against the head of the user. Detents can be provided to bias an earpiece toward the open position and/or the stowed position. Such an arrangement can further provide operative connections for communication across the hinge of the head-mountable device.

Figure 11:
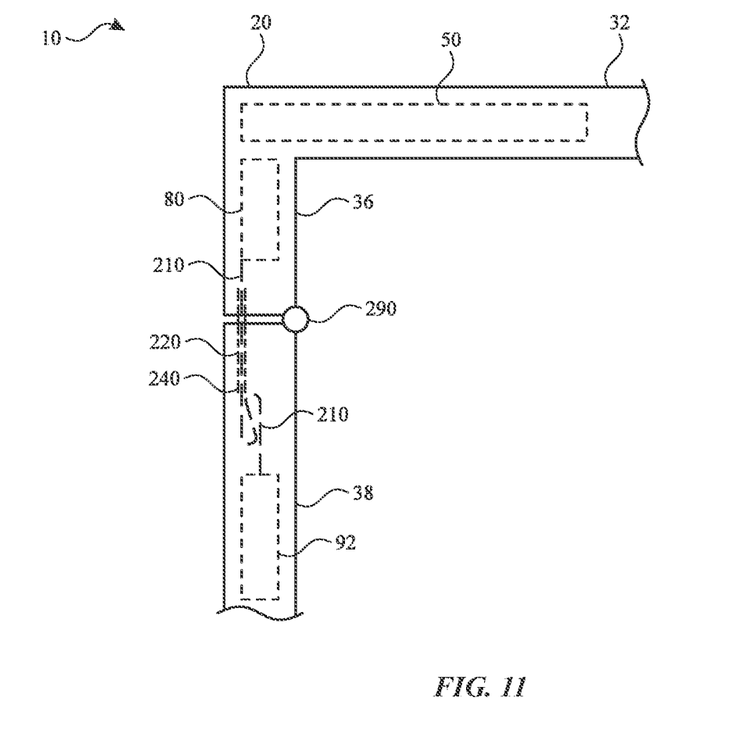
FIG. 11 illustrates a top view of a portion of a head-mountable device in an open position, according to some embodiments of the present disclosure.
Figure 12:
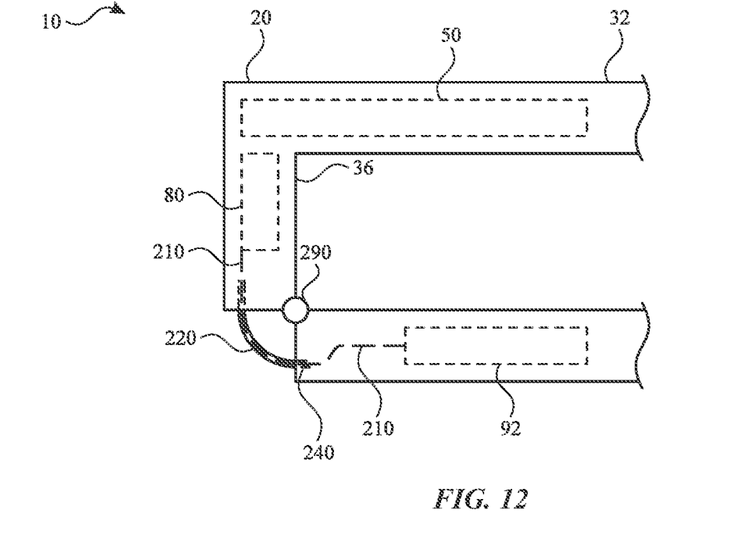
FIG. 12 illustrates a top view of a portion of a head-mountable device in a stowed position, according to some embodiments of the present disclosure.

Referring now to FIGS. 11 and 12, operative connection can also be provided outside a hinge of a head-mountable device.

A hinge 290 can rotatably connect a temple component 36 to an earpiece 38. Each of the components on opposing sides of the hinge 290 can contain electronic components therein. For example, the temple component 36 can include and/or contain the display element 80, which projects light onto a waveguide of an optical module 50 within a frame 20. By further example, the earpiece 38 can include and/or contain the processor 92. It will be understood that other components, including but not limited to those described herein, can be provided on opposing sides of the hinge 290. The hinge 290 can optionally be or include the components of the hinge 100 described herein.

One or more wires 210 can extend through components of the hinge 290 to operatively connect electronic components on opposing sides of the hinge. The one or more wires 210 can extend within a sheath 220 that spans a gap between the temple component 36 and the earpiece 38. The sheath can protect a portion of the wire 210 that is not within either the temple component 36 or the earpiece 38. The sheath 220 and the wire 210 can extend out of the temple component 36 and/or the earpiece 38 to accommodate the rotation of the earpiece 38 relative to the temple component 36.

As shown in FIG. 11, in an open position, the sheath 220 and the wire 210 can span a small gap (or no gap) between the temple component 36 and the earpiece 38. Additional lengths of material for the sheath 220 and/or the wire 210 can be retracted within the temple component 36 and/or the earpiece 38. The additional lengths of material can extend into and/or be folded within a spaces provided by the temple component 36 and/or the earpiece 38.

As shown in FIG. 12, in a stowed position, the sheath 220 and the wire 210 can extend out of the temple component 36 and/or the earpiece 38 to span the gap there between. For example, the sheath 220 and the wire 210 can be fixedly attached to, at, or within one of the temple component 36 and the earpiece 38 and adjustably extend out of the other to maintain a connection while the gap widens during rotation about the hinge 290. The sheath 220 can provide adequate flexibility to accommodate the rotation about the hinge while also providing adequate protection to the portion of the wire 210 that is between the temple component 36 and the earpiece 38. The wire 210 can be positioned at a distance away from the hinge 290 such that the radius of curvature in the stowed position is greater and thereby places less stress on the electrical connection provided by the wire 210.

The sheath 220 can interact with the temple component 36 and/or the earpiece 38 to provide a bias and/or detent 240. For example, the sheath 220 can be resilient to act as a spring element. The sheath 220 can thereby interact with other structures to (e.g., the temple component 36 and/or the earpiece 38) to urge them to move relative to each other. Additionally or alternatively, the sheath 220 can include a detent 240 that interacts with adjacent structures. For example, the sheath 220 can interact with the temple component 36 and/or the earpiece 38 while in the stowed position and/or the open position to snap into the preferred position, as with a detent 240. A sufficiently large force and/or a release mechanisms can release the detent 240 to allow the sheath 220 to resume movement.

Figure 13:
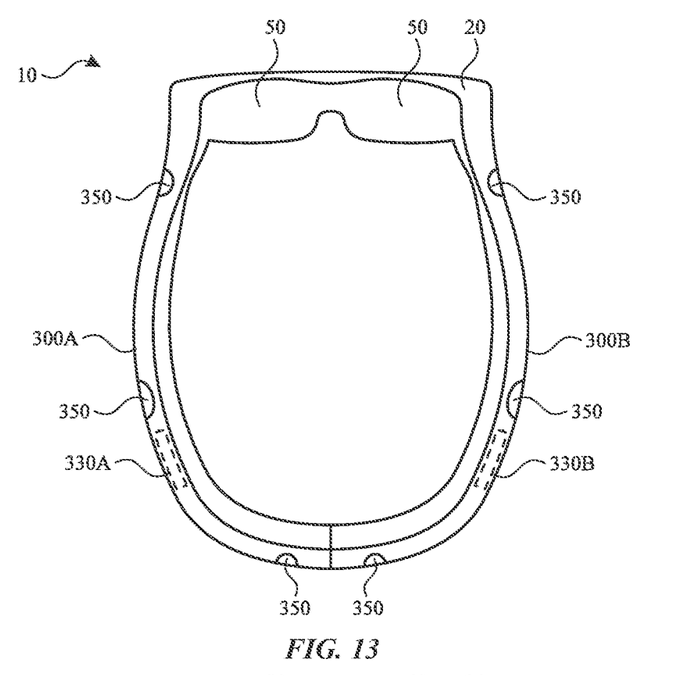
FIG. 13 illustrates a top view of a head-mountable device in a closed position, according to some embodiments of the present disclosure.
Figure 14:
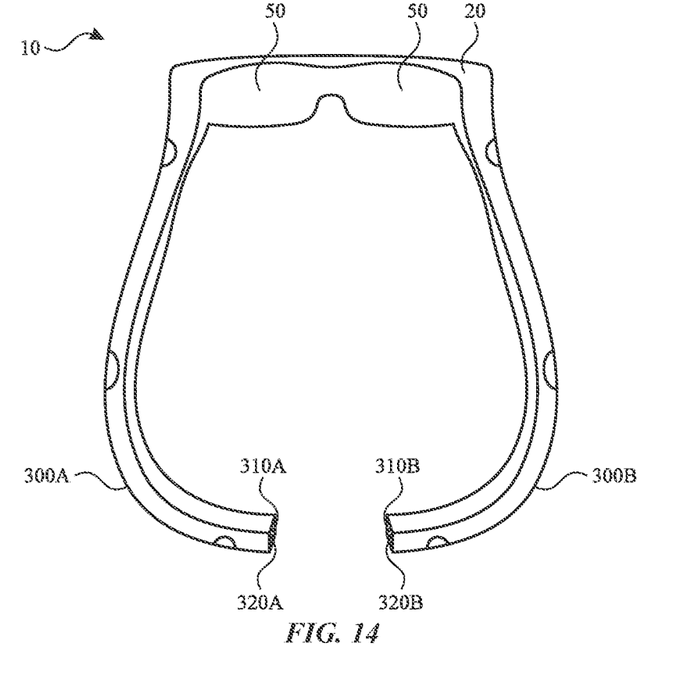
FIG. 14 illustrates a top view of a head-mountable device in an open position, according to some embodiments of the present disclosure.

Referring now to FIGS. 13 and 14, a head-mountable device can provide a secure connection around a head of a user while also providing operable communication across components thereof.

As shown in FIG. 13, a head-mountable device 10 can include a frame 20 supporting one or more optical modules 50. At least two arms 300A and 300B can extend away from the frame 20 to secure the head-mountable device 10 against a head of a user. The head-mountable device 10 can include additional components, such as electrical components (e.g., display element, processor, etc.) described herein. For example, a first arm 300A can support a first electronic component 330A, and a second arm 300B can support a second electronic component 330B.

The arms 300A and 300B can extend about a head of the user, such that the frame 20 and the arms 300A and 300B can form a closed loop. Each of the arms 300A and 300B can provide multiple bend portions 350 that facilitate bending along a length of the corresponding arms. For example, the bend portions 350 can have different materials and/or thicknesses than at other portions of the arms 300A and 300B. Additionally or alternatively, the bend portions 350 can include hinges to facilitate relative rotational movement there about.

As shown in FIG. 14, the arms 300A and 300B can separate from each other to facilitate placement and adjustment by a user. The arms 300A and 300B can securely and releasably engage each other with corresponding attachment elements 310A and 310B. For example, the attachment elements 310A and 310B can mechanically engage each other for securement of the arms 300A and 300B. The attachment elements 310A and 310B can have complementary shapes to facilitate engagement. For example, the attachment elements 310A and 310B can form a protrusion and a groove. The groove can have a shape and/or size that complement the shape and/or size of the protrusion. It will be understood that a variety of shapes and/or sizes can be provided to achieve the engagement between the arms 300A and 300B. It will be further understood that any number of attachment elements 310A and 310B can be provided. By further example, mechanisms such as locks, latches, snaps, screws, clasps, threads, magnets, pins, an interference (e.g., friction) fit, knurl presses, bayoneting, and/or combinations thereof can be included to lock the arms 300A and 300B to each other when the attachment elements 310A and 310B engage each other. While certain mechanical attachment mechanisms are depicted, it will be understood that other mechanical attachment mechanisms are also contemplated. The attachment elements 310A and 310B can remain locked until a release mechanism is actuated. The release mechanism can be provided on an outer surface of the arms 300A and 300B for access by a user. At least some of the interactions between the attachment elements 310A and 310B can be within the arms 300A and 300B.

As further shown in FIG. 14, the arms 300A and 300B can be provided with communication interfaces 320A and 320B to provide operative connections between the electronic components (e.g., electronic components 330A and 330B). The communication interfaces 320A and 320B can include pairs of conductive contacts that are configured to make electrical contact when the arms 300A and 300B are engaged with each other. For example, one or more of the communication interfaces 320A and 320B can include a moveable element for making an electrical connection, such as a pogo pin that is at least partially collapsible and/or a contact pad that is at least partially flexible. By further example, a pogo pin can be spring loaded and/or a contact pad can be formed from an electrically conductive foam or elastomer. Additionally or alternatively, no direct contact may be required to establish a communication link. For example, a communication link between the communication interfaces 320A and 320B can include wireless interfaces, Bluetooth interfaces, Near Field Communication interfaces, magnetic interfaces, inductive interfaces, resonant interfaces, capacitive coupling interfaces, Wi-Fi interfaces, optical interfaces, acoustic interfaces, and/or other communication interfaces.

Figure 15:
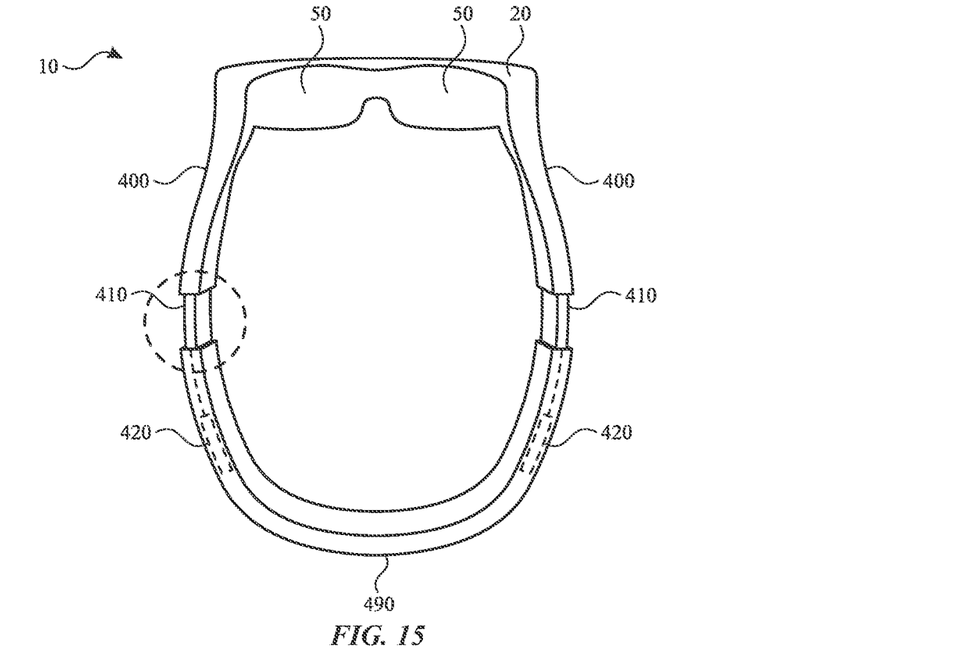
FIG. 15 illustrates a top view of a head-mountable device with a tensioner, according to some embodiments of the present disclosure.
Figure 16:
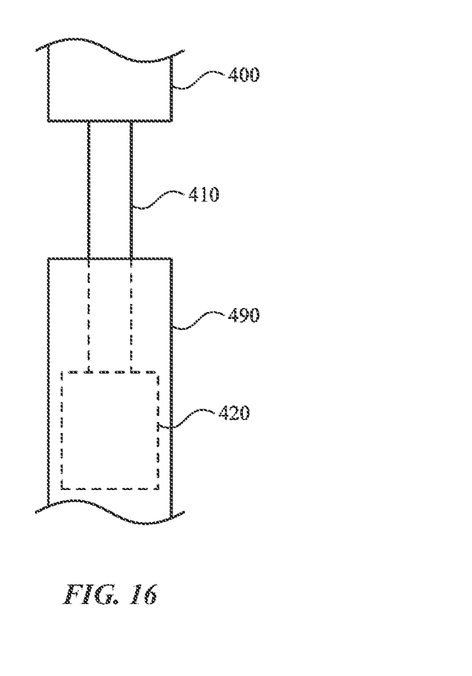
FIG. 16 illustrates a top view of a tensioner assembly of a head-mountable device, according to some embodiments of the present disclosure.
Figure 17:
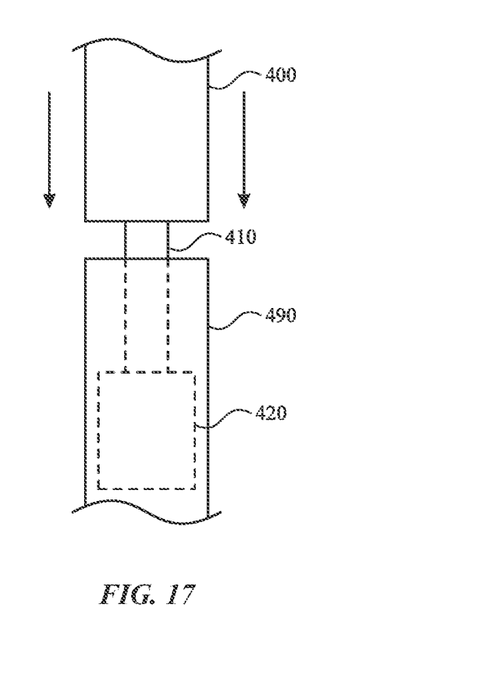
FIG. 17 illustrates a top view of a tensioner assembly of a head-mountable device, according to some embodiments of the present disclosure.

Referring now to FIGS. 15-17, a head-mountable device can provide an adjustable fit around a head of a user.

As shown in FIG. 15, a head-mountable device 10 can include a frame 20 supporting one or more optical modules 50. At least two arms 400 can extend away from the frame 20 to secure the head-mountable device 10 against a head of a user. The arms 400 can be connected by a rear component 490. The head-mountable device 10 can include additional components, such as electrical components (e.g., display element, processor, etc.) described herein. Such components can be positioned on one or more of the arms 400 and/or the rear component 490.

The arms 400 can extend about a head of the user, such that the frame 20, the arms 400, and the rear component 490 can form a closed loop. The rear component 490 can be adjustably connected to one or more of the arms 400 by a connector 410. Each connector 410 can be acted upon by a tensioner 420 to adjust a relative position of an arm 400 and the rear component 490. Additionally or alternatively, the connectors can provided operative and/or electrical communication between the rear component 490 and a corresponding arm 400. While the tensioners are shown as positioned within the rear component 490, it will be understood that the tensioners can be positioned in the rear component 490, the arms 400, another structure, and/or in a space between the arms 400 and the rear component 490.

As shown in FIG. 16, the arm 400 can have an extended position relative to the rear component 490. The tensioner 420 can be operated to allow a connector 410 to extend and form a gap between the arm 400 and the rear component 490. As shown in FIG. 17, the arm 400 can have a retracted position relative to the rear component 490. The tensioner 420 can be operated to allow the connector 410 to retract and reduce or eliminate the gap between the arm 400 and the rear component 490. During such extension and/or retraction, the connector 410 can extend at least partially within the arm 400 and/or the rear component 490.

The tensioner 420 can be or include the tensioner 98 described herein. The tensioner 420 can include one or more of a variety of components. For example, the tensioner 420 can include or be connected to motors, hydraulic actuators, pneumatic actuators, magnetic actuators, piezoelectric actuators, electroactive materials, stepper motors, shape-memory alloys, and the like, as well as drivetrain components such as gears, clutches, and/or transmissions, to facilitate independent or simultaneous movement of components based on operation of corresponding tensioners. In some embodiments, a tensioner can be an analog, digital, or integrated circuit configured to apply an electrical signal to cause tension (either directly or indirectly) to be applied to, or relieved form, the components. In some embodiments, a tensioner can be a physical apparatus such as a motor, electromagnetic coil, or solenoid that can be actuated to cause tension (either directly or indirectly) to be applied to, or relieved from, the components. Accordingly, the term "tensioner" and related phrases and terminology is used herein to generally refer to a circuit, apparatus, controller, or program code executed by a processor, that is configured to cause, either directly or indirectly, tension in a connector to increase or decrease.

It will be understood that the features of the present disclosure can be provided in any combination. For example, the hinge of the embodiments illustrated in FIG. 6 can be combined with the embodiment illustrated in FIGS. 11 and 12, the embodiment illustrated in FIGS. 13 and 14, and/or the embodiment illustrated in FIGS. 15-17. By further example, the hinge of the embodiments illustrated in FIGS. 11 and 12 can be combined with the embodiment illustrated in FIG. 6, the embodiment illustrated in FIGS. 13 and 14, and/or the embodiment illustrated in FIGS. 15-17. By further example, the arrangement of arms of the embodiments illustrated in FIGS. 13 and 14 can be combined with the embodiment illustrated in FIG. 6, the embodiment illustrated in FIGS. 11 and 12, the embodiment illustrated in FIGS. 13 and 14, and/or the embodiment illustrated in FIGS. 15-17. By further example, the tensioner of the embodiments illustrated in FIGS. 15-17 can be combined with the embodiment illustrated in FIG. 6, the embodiment illustrated in FIGS. 11 and 12, and/or the embodiment illustrated in FIGS. 13 and 14.

Accordingly, embodiments of the present disclosure provide a head-mountable device that provides comfortable securement to a head of a user while also providing operative connections for communication across a hinge of the head-mountable device. The securement can be based on an arrangement of spring elements that have biased configurations and allow gentle retraction against a head of the user. Head-mountable devices of the present disclosure can provide adjustable securement against a head of a user by allowing custom fitting, for example with a tensioner.

Various examples of aspects of the disclosure are described below as clauses for convenience. These are provided as examples, and do not limit the subject technology.

Clause A: a head-mountable device comprising: a frame supporting an optical module; a temple component supporting a first electronic component; an earpiece supporting a second electronic component; and a hinge configured to allow the earpiece to rotate relative to the temple component and about an axis of rotation, the hinge comprising: a cam comprising a ramp; a follower; and a spring element biasing the follower against the ramp of the cam; a wire operatively connecting the first electronic component to the second electronic component and extending through the cam, the follower, and the spring element.

Clause B: a head-mountable device comprising: a frame supporting an optical module; a temple component supporting a first electronic component; an earpiece supporting a second electronic component; and a hinge configured to allow the earpiece to rotate relative to the temple component; a sheath extending between the temple component and the earpiece; and a wire extending within the sheath and operatively connecting the first electronic component to the second electronic component, wherein: in an open position with the earpiece extended away from the frame, a portion of the sheath and the wire are within the earpiece; and in a stowed position with the earpiece collapsed toward the frame, the portion of the sheath and the wire are extended out of the earpiece.

Clause C: a head-mountable device comprising: a frame supporting optical modules; a first arm comprising: a first electronic component; a first attachment element; and a first communication interface; and a second arm comprising: a second electronic component; a second attachment element; and a second communication interface, wherein, when the first arm is attached to the second arm, the first electronic component is operably connected to the second electronic component via the first communication interface and the second communication interface.

Clause D: a head-mountable device comprising: a frame supporting an optical module; a first arm and a second arm extending from the frame; a rear component connected to the first arm by a connector; a processor; a tensioner operable by the processor to controllably adjust a distance between the first arm and the rear component.

One or more of the above clauses can include one or more of the features described below. It is noted that any of the following clauses may be combined in any combination with each other, and placed into a respective independent clause, e.g., Clause A, B, or C.

Clause 1: the hinge is configured to allow the earpiece to rotate relative to the temple component and between: a stowed position with the earpiece collapsed toward the frame; an open position with the earpiece extended away from the frame; and a head retention position with the earpiece biased away from the frame and beyond the open position, wherein the hinge is biased to require a first maximum torque when transitioning from the stowed position to the open position and a second maximum torque when transitioning from the open position to the head retention position, the first maximum torque being greater than the second maximum torque.

Clause 2: the spring element has a parabolic force response across a range of displacements as the earpiece rotates relative to the temple component.

Clause 3: the parabolic force response of the spring element has a maximum value at a middle region within the range of displacements.

Clause 4: the spring element comprises a Belleville spring.

Clause 5: the spring element comprises multiple Belleville springs in a series arrangement.

Clause 6: the spring element comprises multiple Belleville springs in a parallel arrangement.

Clause 7: the optical module comprises a waveguide; and the first electronic component comprises a display element configured to project light to the waveguide.

Clause 8: the sheath comprises a detent configured to interact with the earpiece to releasably retain the earpiece in the open position or the stowed position.

Clause 9: in the open position, the wire is folded onto itself within the earpiece.

Clause 10: the optical modules comprise a first optical module having a first waveguide and a second optical module having a second waveguide; the first electronic component is a first display element configured to project light to the first waveguide; and the second electronic component is a second display element configured to project light to the second waveguide.

Clause 11: the first arm comprises bend portions between the frame and the first attachment element; and the second arm comprises bend portions between the frame and the second attachment element.

Clause 12: the frame, the first arm, and the second arm form a loop for surrounding a head of a user.

Clause 13: the tensioner is configured to controllably retract a portion of the connector into the rear component or deploy the portion of the connector out of the rear component.

Clause 14: the tensioner is a first tensioner; and the head-mountable device further comprises a second tensioner operable by the processor to controllably adjust a distance between the second arm and the rear component.

Clause 15: the frame, the first arm, the second arm, and the rear component form a loop for surrounding a head of a user.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
a frame supporting an optical module;

a temple component supporting a first electronic component;
an earpiece supporting a second electronic component; and
a hinge configured to allow the earpiece to rotate relative to the temple component and about an axis of rotation, the hinge comprising:
  a cam comprising a ramp;
  a follower; and
  a spring element biasing the follower against the ramp of the cam;
a wire operatively connecting the first electronic component to the second electronic component and extending through the cam, the follower, and the spring element,
wherein the hinge is configured to allow the earpiece to rotate relative to the temple component and between:
  a stowed position with the earpiece collapsed toward the frame;
  an open position with the earpiece extended away from the frame; and
  a head retention position with the earpiece biased away from the frame and beyond the open position, wherein the hinge is biased to require a first maximum torque when transitioning from the stowed position to the open position and a second maximum torque when transitioning from the open position to the head retention position, the first maximum torque being greater than the second maximum torque.

2. The head-mountable device of claim 1, wherein the spring element has a parabolic force response across a range of displacements as the earpiece rotates relative to the temple component.

3. The head-mountable device of claim 2, wherein the parabolic force response of the spring element has a maximum value at a middle region within the range of displacements.

4. The head-mountable device of claim 1, wherein the spring element comprises a Belleville spring.

5. The head-mountable device of claim 1, wherein the spring element comprises multiple Belleville springs in a series arrangement.

6. The head-mountable device of claim 1, wherein the spring element comprises multiple Belleville springs in a parallel arrangement.

7. The head-mountable device of claim 1, wherein:
the optical module comprises a waveguide; and
the first electronic component comprises a display element configured to project light to the waveguide.

8. A head-mountable device comprising:
a frame supporting an optical module;
a temple component supporting a first electronic component;
an earpiece supporting a second electronic component; and
a hinge configured to allow the earpiece to rotate relative to the temple component;
a sheath extending between the temple component and the earpiece, wherein the sheath is configured to bias the temple component and the earpiece to urge the temple component and the earpiece to move relative to each other; and
a wire extending within the sheath and operatively connecting the first electronic component to the second electronic component, wherein:
  in an open position with the earpiece extended away from the frame, a portion of the sheath and the wire are within the earpiece; and
  in a stowed position with the earpiece collapsed toward the frame, the portion of the sheath and the wire are extended out of the earpiece.

9. The head-mountable device of claim 8, wherein the sheath comprises a detent configured to interact with the earpiece to releasably retain the earpiece in the open position or the stowed position.

10. The head-mountable device of claim 8, wherein, in the open position, the wire is folded onto itself within the earpiece.

11. The head-mountable device of claim 8, wherein:
the optical module comprises a waveguide; and
the first electronic component comprises a display element configured to project light to the waveguide.

12. A head-mountable device comprising:
a frame supporting optical modules;
a first arm comprising:
  a first electronic component;
  a first attachment element at an end of the first arm that is opposite the frame; and
  a first communication interface at the end of the first arm that is opposite the frame; and
a second arm comprising:
  a second electronic component;
  a second attachment element at an end of the second arm that is opposite the frame; and
  a second communication interface at the end of the second arm that is opposite the frame, wherein, when the end of the first arm is attached to the end of the second arm, the first electronic component is operably connected to the second electronic component via the first communication interface and the second communication interface.

13. The head-mountable device of claim 12, wherein:
the optical modules comprise a first optical module having a first waveguide and a second optical module having a second waveguide;
the first electronic component is a first display element configured to project light to the first waveguide; and
the second electronic component is a second display element configured to project light to the second waveguide.

14. The head-mountable device of claim 12, wherein:
the first arm comprises bend portions between the frame and the first attachment element; and
the second arm comprises bend portions between the frame and the second attachment element.

15. The head-mountable device of claim 12, wherein the frame, the first arm, and the second arm form a loop for surrounding a head of a user.

16. The head-mountable device of claim 14, wherein the bend portions of the first arm and the second arm comprise a material that is different than a material of other portions of the first arm and the second arm.

17. The head-mountable device of claim 14, wherein the bend portions of the first arm and the second arm have a thickness that is different than a thickness at other portions of the first arm and the second arm.

18. The head-mountable device of claim 14, wherein the bend portions of the first arm and the second arm each comprise a hinge.

19. The head-mountable device of claim 12, wherein first attachment element forms a protrusion, and the second attachment element forms a groove that complements the protrusion of the first attachment element.

* * * * *